April 7, 1953  T. G. WILLIAMSON ET AL  2,634,003
VEHICLE LOADER
Filed Oct. 31, 1949
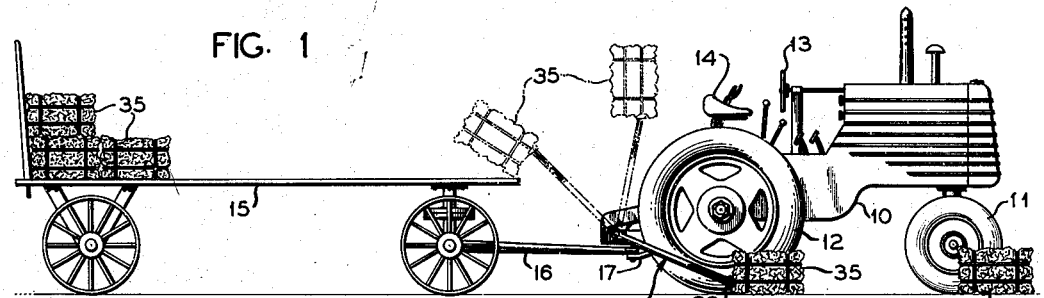
FIG. 1
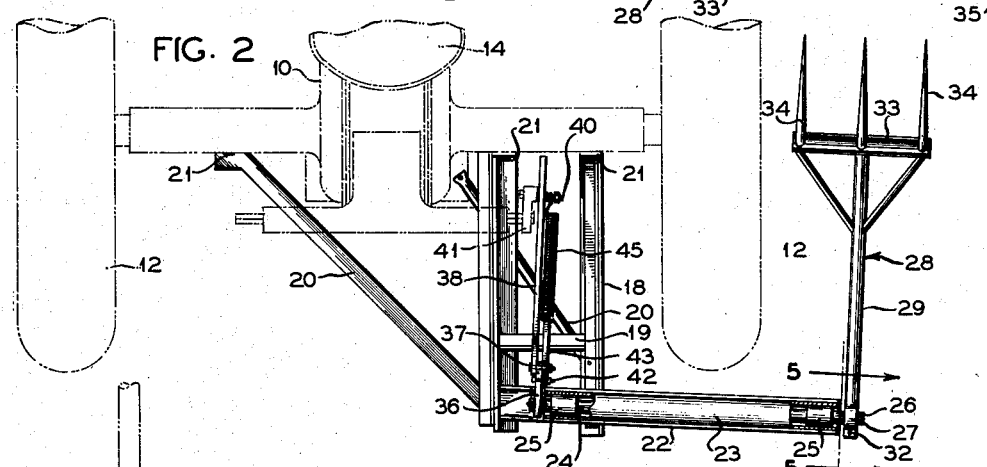
FIG. 2
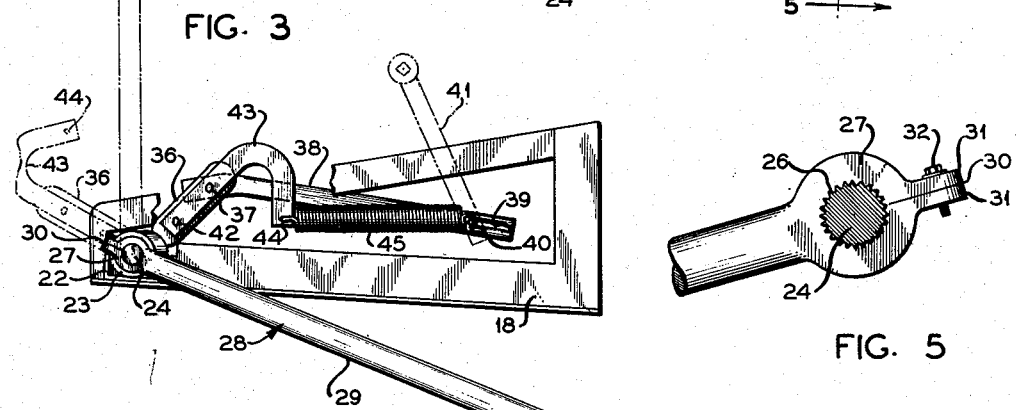
FIG. 3
FIG. 5
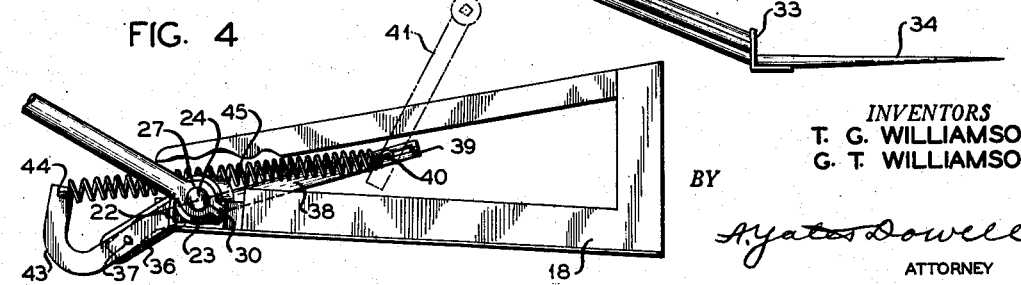
FIG. 4
INVENTORS
T. G. WILLIAMSON
G. T. WILLIAMSON
BY
A. Yates Dowell
ATTORNEY Patented Apr. 7, 1953

2,634,003

UNITED STATES PATENT OFFICE 2,634,003

VEHICLE LOADER

Thomas G. Williamson and George T. Williamson,
Athens, Ga.

Application October 31, 1949, Serial No. 124,662

8 Claims. (Cl. 214—42)

This invention relates to material or article handling and more particularly to an apparatus adapted for attachment to a conventional farm tractor for engaging bales of hay or the like resting on the ground and lifting these bales to deposit the same on a vehicle or trailer towed by the tractor.

Heretofore numerous devices of this nature have been proposed, but in general these have taken the form of relatively complicated apparatus comprising in many instances an entirely separate vehicle incorporating mechanism to lift articles or material from the ground and transfer the same to the body of another vehicle. These prior art devices have been relatively expensive both as to first cost and as to maintenance and likewise have caused frequent loss of time due to breakdown.

It is therefore an object of this invention to provide a relatively simple vehicle loader which may be conveniently attached to a conventional farm tractor and operated by standard mechanism on the tractor, the loader being designed to engage articles or material resting on the ground and to transfer the same to the body of a vehicle towed behind the tractor.

It is a further object of this invention to provide a vehicle loader adapted to be attached to a conventional farm tractor and in which power is required for only a portion of the cycle of operation, the load being raised to a position slightly past top dead center whereupon the weight of the load completes the movement of the loader, the mechanism being returned to load engaging position by resilient means incorporated in the mechanism.

It is a further object of this invention to provide a vehicle loader of relatively simple and fool-proof construction which may be conveniently attached to a conventional farm tractor by the ordinary farm mechanic without requiring the use of special tools and in which means is provided for adjusting the position of the load engaging member.

It is a further object of the invention to provide a vehicle loader particularly adapted to engage and transfer bales of hay from the ground to the body of a vehicle towed behind a conventional farm tractor and in which the load engaging member is in the form of a fork adapted to penetrate the bale of hay during forward movement of the tractor.

It is a further object of the invention to provide a vehicle loader adapted to be attached to a conventional farm tractor which may be economically constructed of readily available materials requiring substantially no skilled labor and resulting in a substantially fool-proof mechanism adapted for constant use and long wear.

Further objects and advantages of this invention will be apparent from the following specification taken in conjunction with the accompanying drawing, wherein:

Fig. 1 is an elevational view showing the loader of this invention attached to a conventional farm tractor with the load engaging member shown in full lines engaging a bale of hay resting upon the ground and showing in phantom the load and load engaging member in the process of transferring the load to a vehicle towed by the tractor;

Fig. 2, a fragmentary plan view showing the manner of attachment of the loader to the tractor;

Fig. 3, a fragmentary elevational view with parts broken away for greater clarity showing the operating mechanism with the load engaging member in initial load engaging position;

Fig. 4, a fragmentary view similar to Fig. 3 and showing the mechanism in position to deposit a load on the trailing vehicle; and Fig. 5, a sectional view on the line 5—5 of Fig. 2 showing the manner of adjusting the position of the load engaging member.

With continued reference to the drawing, there is shown in Fig. 1 a conventional farm tractor 10 having steerable front wheels 11 and rear drive wheels 12. The tractor is provided with the usual steering wheel 13, operator's seat 14 and various control levers and pedals as shown. A flat bed wagon or other appropriate vehicle 15 may be towed behind the tractor 10 by the usual draft bar or tongue 16 attached to the conventional hitch 17 provided on the tractor 10.

On modern farms engaged in the raising of hay for commercial use or in fact frequently for use on the farm itself, it is customary to bale the hay on the field by a travelling baler and during this operation the bales are periodically deposited upon the ground to rest thereon in rows. Heretofore it has been necessary to manually lift these bales and deposit the same on a vehicle for transportation to the storage barn or railroad. The device of this invention is designed to be attached to the conventional farm tractor which may proceed over the hay field with a vehicle in tow and automatically engage and deposit the bales one after another on the towed vehicle. This operation requires only a driver for the tractor and one man on the vehicle to position and stack the bales thereon. Since the bales are deposited on the ground at substantially periodic intervals the mechanism forming the loader of this invention may be so adjusted as to efficiently operate in the time interval occupied by the tractor in travelling from one bale to the next at a substantially constant rate of speed whereby the operation may be continuous without the necessity of stopping at each bale.

The loader of this invention comprises a generally rectangular framework 18 which may be constructed of angle iron or other equivalent structural shapes welded or otherwise suitably secured together and which may be provided with cross braces 19 and diagonally arranged attaching bars 20. The device is attached to the rear axle or other appropriate portion of the tractor 10 by screw threaded fastening means or the like 21 and when in position, the framework 18 extends a short distance to the rear of the drive wheels 12.

Secured to the frame 18 and extending laterally therefrom but at an angle to the longitudinal axis of the tractor is a tubular supporting member 22 receiving a bearing sleeve 23 within which is journalled a shaft 24. If desired, shaft 24 may be provided with spaced enlarged bearing portions 25 which serve to adequately journal the shaft 24 within the sleeve 23 at spaced points and to reduce friction to a minimum. Shaft 24 at the outer end thereof is provided with splines 26 serving to receive a splined portion 27 of a load engaging member 28. Load engaging member 28 may conveniently comprise an elongated bar 29 incorporating the spline portion 27 and being split at 30 to provide ears 31 which may be drawn toward each other by a bolt or the like 30. Operation of the bolt 30 serves to clamp the portion 27 securely upon the splines 26 on the shaft 24 and upon retraction of the bolt 20 the bar 29 may be removed from shaft 24 and positioned at any desired angular relation thereto.

Bar 29 may conveniently carry at the end opposite from spline portion 27 a fork 33 having a plurality of teeth 34 serving to penetrate and engage a bale of hay or other appropriate article 35 resting upon the ground. Obviously fork 33 may be replaced by other desired load engaging means such as a scoop or shovel and if desired, some form of gripping means might be substituted therefor.

Shaft 24 is provided at its inner end with a crank arm 36 rigidly secured thereto, and pivotally mounted on crank arm 36 by a pin 37 or the like is an operating link 38. Link 38 is provided at the opposite end with a slot 39 engaged by a pin 40 provided on a power operated lever 41 forming part of the conventional lift mechanism of the tractor 10. Also mounted on crank arm 36 by fastening means 42 is a crescent shaped extension 43 which is provided at the end remote from the crank arm 36 with an aperture 44 for receiving one end of a tension spring 45. The opposite end of tension spring 45 is secured to pin 40 mounted on the lever 41.

It will be noted from an inspection of Figs. 1 and 2 that the load engaging member 28 extends forwardly and to one side of the drive wheel 12 of the tractor 10 and consequently when in load engaging position, as shown in full lines in Fig. 1, will engage and penetrate bales of hay 35 or other articles positioned on the ground to one side of the path of movement of the tractor 10. In operation the tractor 10 is driven forward at a substantially constant rate of speed and upon engagement and penetration of the teeth 34 of fork 33 with a bale of hay or the like 35, the operator actuates the control mechanism to cause movement of the lever 41 in a clockwise direction as viewed in Fig. 3, movement of this lever causing pin 40 to engage the inner end of slot 39, thus moving the link 38 rearwardly to rotate shaft 24 in a counterclockwise direction as viewed in Fig. 3. Counterclockwise movement of shaft 24 results in raising the fork 33 and load carried thereby, and this movement will be continued under the action of lever 41 until the load passes top dead center at which time the weight of the bale 35 will cause continued movement in a rearward and downward direction, this movement being permitted by the lost motion connection provided by slot 39 and pin 40, movement of lever 41 ceasing immediately after the load passes top dead center. The load moves rearwardly and downwardly, as shown in phantom in Fig. 1, until the bale 35 is deposited on the vehicle 15, at which time the bale may be arranged or stacked thereon in any desired manner. The downward movement of the bale 35 and fork 33 will be retarded by spring 45, thus preventing too rapid movement and consequent strain on the parts.

Shortly after the load passes top dead center the tractor operator will reverse the movement of lever 41 to return the same to original position, and upon depositing the bale 35 on the vehicle 15 and consequent removal of weight from the fork 33, the spring 45 will serve to return without further attention from the operator.

Fig. 4 shows the mechanism in position to deposit the bale 35 on the vehicle 15, and it will be noted that the crank arm 36 has passed beyond dead center. Consequently the provision of the crescent shaped extension 43 serves to provide a point for the application of tension from spring 45 which has not passed beyond dead center, and consequently the mechanism may be returned to original position thereby, whereas such an operation could not be accomplished by reverse movement of the link 38.

It is noted that the angular position of tubular supporting member 22 and the shaft and load engaging member 28 carried thereby serves to move the bale 35 inwardly upon rotation of the shaft 24 and consequently will deposit the bale well within the confines of the vehicle 15 without necessitating the use of a vehicle with an exceptionally wide and cumbersome body.

It will thus be seen by the above described invention that there has been provided a relatively simple loading device which may be economically constructed of readily available material requiring no expensive closely machined parts and one which will operate at a sufficient rate of speed without undue shock or vibration and which will efficiently serve to engage articles such as bales of hay resting on the ground and transfer the same to a vehicle towed behind the conventional farm tractor. The device of invention may be applied to the conventional farm tractor by the ordinary farm mechanic and is designed to utilize the conventional power driven lifting mechanism provided on the tractor, thus requiring no special power operating mechanism.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. A vehicle loader comprising a frame attached to a tractor, a shaft journalled in said frame at an angle to the longitudinal axis of said tractor and terminating outwardly of one of the tractor drive wheels, a lifting arm adjustably mounted on the outer end of said shaft, a load engaging fork secured to the opposite end of said lifting arm, said lifting arm and said fork extending forwardly of said tractor at one side thereof when in load engaging position, a crank arm secured to the inner end of said shaft, a link having one end pivotally mounted on said crank arm, a slot in the opposite end of said link, a power operated lever on said tractor, a pin on said lever engaging said slot to provide a lost motion driving connection, a crescent shaped extension on said crank arm, and a tension spring secured at one end to said extension, the opposite end being secured to said pin whereby upon operation of said lever in one direction said shaft will be rotated to move said fork and a load carried thereby upwardly and rearwardly past top dead center whereupon the weight of said load will move said fork downwardly and rearwardly to deposit the load on a vehicle towed by said tractor, said last named movement being retarded by said spring, said spring also serving to return said fork to load engaging position.

2. A vehicle loader comprising a frame attached to a tractor, a shaft journalled in said frame at an angle to the longitudinal axis of said tractor and terminating outwardly of one of the tractor drive wheels, a lifting arm adjustably mounted on the outer end of said shaft, a load engaging form secured to the opposite end of said lifting arm, said lifting arm and said fork extending forwardly of said tractor at one side thereof when in load engaging position, a crank arm secured to the inner end of said shaft, a link having one end pivotally mounted on said crank arm, a slot in the opposite end of said link, a power operated lever on said tractor, a pin on said lever engaging said slot to provide a lost motion driving connection, a crescent shaped extension on said crank arm, and a tension spring secured at one end to said extension, the opposite end being secured to said pin whereby upon operation of said lever in one direction said shaft will be rotated to move said fork and a load carried thereby upwardly and rearwardly past top dead center whereupon the weight of said load will move said fork downwardly and rearwardly to deposit the load on a vehicle towed by said tractor.

3. A vehicle loader comprising a frame attached to a tractor, a shaft journalled in said frame laterally of said tractor and terminating outwardly of one of the tractor drive wheels, a lifting arm having one end adjustably mounted on the outer end of said shaft, a load engaging fork secured to the opposite end of said lifting arm, said lifting arm and said fork extending forwardly of said tractor at one side thereof when in load engaging position, a crank arm secured to the inner end of said shaft, a link having one end pivotally mounted on said crank arm, a slot in the opposite end of said link, a power operated lever on said tractor, a pin on said lever engaging said slot to provide a lost motion driving connection, a crescent shaped extension on said crank arm, a tension spring secured at one end to said extension, the opposite end being secured to said pin whereby upon operation of said lever in one direction said shaft will be rotated to move said fork and a load carried thereby upwardly and rearwardly past top dead center whereupon the weight of said load will move said fork downwardly and rearwardly to deposit the load on a vehicle towed by said tractor, said last named movement being retarded by said spring, said spring also serving to return said fork to load engaging position.

4. A vehicle loader comprising a frame attached to a tractor, a shaft journalled in said frame laterally of said tractor and terminating outwardly of one of the tractor drive wheels, a lifting arm adjustably mounted on the outer end of said shaft, a load engaging fork secured to the opposite end of said lifting arm, said lifting arm and said fork extending forwardly along said tractor at one side thereof when in load engaging position, a crank arm secured to the inner end of said shaft, a link having one end pivotally mounted on said crank arm, a slot in the opposite end of said link, a power operated lever on said tractor, a pin on said lever engaging said slot to provide a lost motion driving connection whereby upon operation of said lever in one direction said shaft will be rotated to move said fork and a load carried thereby upwardly and rearwardly past top dead center whereupon the weight of said load will move said fork downwardly and rearwardly to deposit the load on a vehicle towed by said tractor.

5. A vehicle loader comprising a frame attached to a tractor, a shaft journalled in said frame laterally of said tractor and terminating outwardly of one of the tractor drive wheels, a lifting arm having one end secured to the outer end of said shaft, a load engaging member secured to the opposite end of said lifting arm, said lifting arm and said member extending forwardly of said tractor at one side thereof when in load engaging position, a crank arm secured to the inner end of said shaft, a link having one end pivotally mounted on said crank arm, a slot in the opposite end of said link, a power operated lever on said tractor, a pin on said lever engaging said slot to provide a lost motion driving connection, an extension on said crank arm, a tension spring secured at one end to said extension, the opposite end being secured to said pin whereby upon operation of said lever in one direction said shaft will be rotated to move said member and a load carried thereby upwardly and rearwardly past top dead center whereupon the weight of said load will move said member downwardly and rearwardly to deposit the load on a vehicle towed by said tractor, said last named movement being retarded by said spring, said spring also serving to return said member to load engaging position.

6. A vehicle loader comprising a frame attached to a tractor, a shaft journalled in said frame laterally of said tractor and terminating outwardly of one of the tractor drive wheels, a lifting arm secured to the outer end of said shaft, a load engaging member secured to the opposite end of said lifting arm, said lifting arm and said member extending forwardly along said tractor at one side thereof when in load engaging position, a crank arm secured to the inner end of said shaft, a link having one end pivotally mounted on said crank arm, a slot in the opposite end of said link, a power operated lever on said tractor, a pin on said lever engaging said slot to provide a lost motion driving connection whereby upon operation of said lever in one direction said shaft will be rotated to move said member and a load carried thereby upwardly and rearwardly past top dead center whereupon the weight of said load will move said member downwardly and rearwardly to deposit the load on a vehicle towed by said tractor.

7. A vehicle loader comprising a frame attached to a tractor, a shaft journalled in said frame laterally of said tractor and terminating outwardly of one of the tractor drive wheels, a load engaging member secured to the outer end of said shaft, a crank arm secured to the inner end of said shaft, a power operated lever on said tractor, means providing a lost motion driving connection between said lever and said crank arm, a crescent shaped extension on said crank arm, a tension spring secured at one end to said extension, the opposite end being secured to said lever whereby upon operation of said lever in one direction said shaft will be rotated to move said member and a load carried thereby upwardly and rearwardly past top dead center whereupon the weight of said load will move said member downwardly and rearwardly to deposit the load on a vehicle, said last named movement being retarded by said spring, said spring also serving to return said member to load engaging position.

8. A vehicle loader comprising a frame attached to a tractor shaft journalled in said frame laterally of said tractor, a load engaging member secured to the outer end of said shaft, a crank arm secured to the inner end of said shaft, a power operated lever on said tractor, means providing a lost motion driving connection between said lever and said crank arm, an extension on said crank arm, a tension spring secured at one end to said extension, the opposite end being secured to said lever whereby upon operation of said lever in one direction said shaft will be rotated to move said member and a load carried thereby upwardly and rearwardly past top dead center whereupon the weight of said load will move said member downwardly and rearwardly to deposit the load on a vehicle, said last named movement being retarded by said spring, said spring also serving to return said member to load engaging position.

THOS. G. WILLIAMSON.
GEO. T. WILLIAMSON.

REFERENCES CITED

The following references are of record in the file of this patent:

UNITED STATES PATENTS

| Number | Name | Date |
| --- | --- | --- |
| 634,599 | Wilson | Oct. 10, 1899 |
| 875,535 | Lawrence | Dec. 31, 1907 |
| 966,009 | Goynon | Aug. 2, 1910 |
| 1,987,042 | Anderson | Jan. 8, 1935 |
| 2,234,599 | Johnston | Mar. 11, 1941 |
| 2,491,079 | Bestland | Dec. 13, 1949 |